INVENTOR
K. H. GRIESENBROCK
ATTORNEYS

United States Patent Office 3,450,224
Patented June 17, 1969

3,450,224
CONTROL MEANS FOR A HYDROSTATIC VEHICLE DRIVE
Karl-Heinz Griesenbrock, Duisburg, Germany, assignor to Eaton Yale & Towne Inc., Velbert-Rhineland, Germany, a corporation of Germany
Filed Feb. 2, 1967, Ser. No. 613,468
Int. Cl. B60k 3/02; F02b 41/00
U.S. Cl. 180—66          11 Claims

ABSTRACT OF THE DISCLOSURE

A control linkage interconnects an engine treadle and the pump of a hydrostatic drive powered by the engine. A hydraulic device responsive to pump pressure is associated with the linkage to decrease displacement of the pump independently of engine treadle operation when the pump pressure exceeds a predetermined amount.

---

This invention relates to a control means for an engine powered hydrostatic vehicle drive having a variable displacement hydraulic pump and preferably a fixed displacement hydraulic motor. More particularly, this invention relates to a control means for a hydrostatic vehicle drive, said control means including a transmission governor to vary the transmission ratio as a function of the driving pedal adjustment and the load of the drive such that the displacement volume of the hydraulic pump is automatically decreased when the load increases and vice versa. The control means of this invention is applicable to any hydrostatic vehicle drive including those for powered industrial lift trucks.

It is an object of this invention to provide a simple but yet reliable control means for a hydrostatic drive.

It is a further object of this invention to provide a control means for a hydrostatic drive made up entirely of relatively simple mechanical linkages and hydraulic systems which in combination eliminate the complicated control elements, valves, booster pumps, and the like as are required for the control means of the prior art.

It is a still further object of this invention to provide a control means for a hydrostatic vehicle drive including a variable displacement hydraulic pump that is engine driven and wherein the control means maintains the pump in a minimum volume condition, preferably zero displacement, when the engine is not driving.

It is a still further object of this invention to provide a control means for a hydrostatic vehicle drive that includes a mechanical connection between the engine controlling treadle or driving pedal and the pump, and a hydraulic mechanism to override the mechanical control as the pressure generated by the pump increases.

The mechanical linkage between the driving pedal and the variable displacement pump of this invention includes a driving dog actuated by a direction reversing switch and capable of optionally engaging either one of two operating rods. The length of travel of each respective operating rod controls the displacement volume of the hydraulic pump. One operating rod acts as a controlling linkage in a forward direction and the other rod acts as a controlling linkage in a reverse direction of the hydraulic pump. A hydraulic adjusting device is connected to the driving dog and to the pressure circuit of the hydrostatic transmission. The purpose of the hydraulic adjusting device is to override the mechanical linkage between the foot pedal and the hydraulic pump in the case of increasing load to thus decrease the displacement volume of the hydraulic pump.

The preferred embodiment of the invention will now be described with reference to the accompanying drawings in which.

Figure 1:
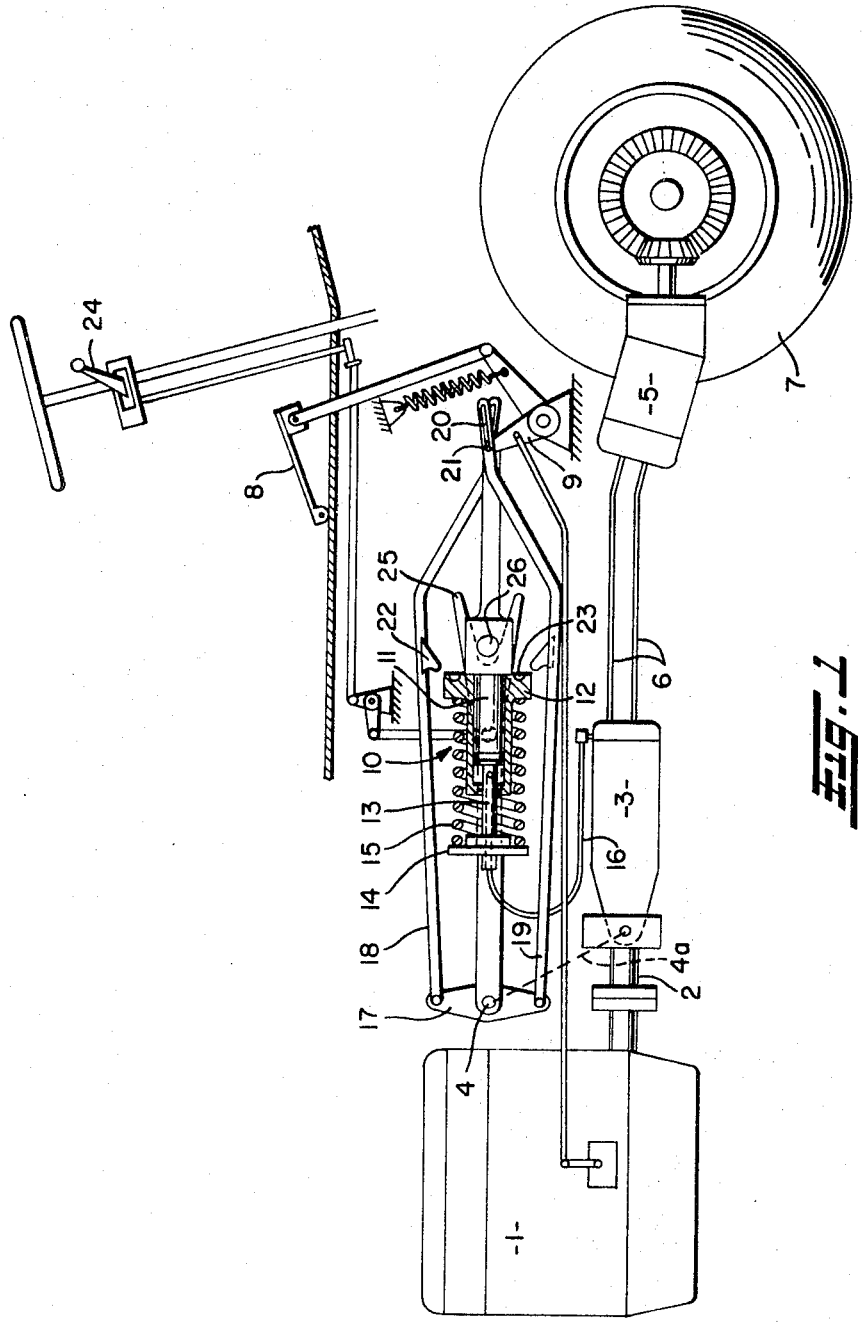
FIGURE 1 is a side elevational view, partly in section, of the hydrostatic drive control means according to this invention.
Figure 2:
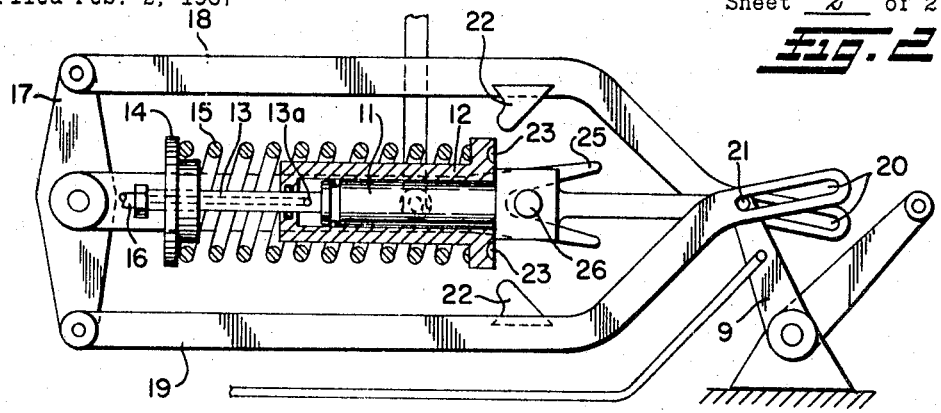
FIGURE 2 is a side elevational view, partly in section, showing the hydrostatic vehicle drive control in a neutral position.

Reference is now made to FIGURE 1 wherein there is shown a wheeled vehicle including a hydrostatic drive mechanism incorporating the control means of this invention. The wheeled vehicle includes an internal combustion engine 1 driving a variable displacement hydraulic pump 3 by means of drive shaft 2.

The variable displacement hydraulic pump, as shown in FIGURE 1 is of a conventional type well known in the art and includes a cylinder block rotating within a pump housing, said cylinder block being connected to a driving flange of the driving shaft 2. Slidably reciprocable within the cylinder block are a plurality of pistons having piston rods connected to a tiltable plate that may be swiveled relative to the driving shaft to thus adjust the volumetric delivery of the pump. If the tiltable plate is at a right angle to the driving shaft, output of the pump is zero. The swiveling of the tiltable plate will produce a variable output in either of the hydraulic lines 6 depending on the angle of tilt and the direction of tilt. Control of the tiltable plate is accomplished by means of an adjusting shaft 4 and a schematically indicated connection 4a in a manner to be described more fully hereinafter.

The variable displacement hydraulic pump is connected to a hydraulic motor 5 by means of hydraulic lines 6. Hydraulic motor 5 is of the fixed displacement type and acts directly on a driving wheel 7 of the vehicle. In FIGURE 1 only one hydraulic motor is shown although it should be understood that as a matter of course, several hydraulic motors can be provided for driving several wheels of the vehicle.

The internal combustion engine 1 or driving engine is controlled by means of a driving or accelerator pedal 8. Driving pedal 8 is connected to the internal combustion engine 1 by a suitable mechanical linkage such as is shown in FIGURE 1 including a bell crank lever 9.

Interconnected into the linkage connecting driving pedal 8 and the internal combustion 1 is a mechanism which I term broadly driving dog 10. As shown in FIGURES 1–4, driving dog 10 is pivotally secured to member 9 by a hinge bolt or pin 21. Driving dog 10 includes a plunger or piston 11 disposed within a cylinder 12. Rod 13 is secured to plunger 11 and protrudes from one end of cylinder 12. An abutment 14 is provided at the end of rod 13. Sealing between rod 13 and cylinder 12 is provided by means of O-rings disposed within cylinder 12. At the right-hand end of cylinder 12, as shown in FIGURE 1, there is provided an enlarged flange portion having notches 23 defined in an exterior surface of the flange. A compression spring 15 is trapped between the flange of cylinder 12 and the abutment 14 for a purpose to be more fully described hereafter.

Rod 13 is hollow and includes a passageway and an orifice 13a providing communication between hydraulic line 16 and the interior of cylinder 12 adjacent one end of plunger 11. Hydraulic line 16 provides fluid communication from the output side of the hydraulic pump 3 and the interior of cylinder 12 such that the plunger 11 is acted upon by the pressure in lines 6.

Figure 3:
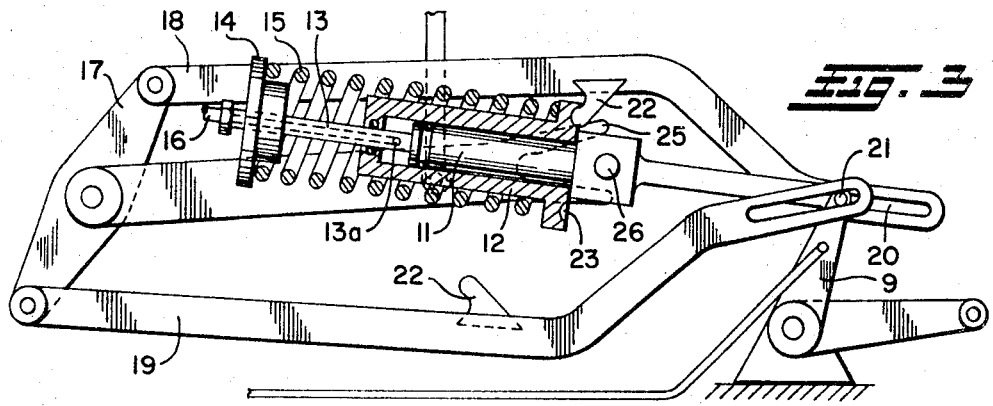
FIGURE 3 is a side elevational view, partly in section, similar to FIGURE 2 and with the hydrostatic vehicle drive control in a forward position.

Fixedly secured to the adjusting shaft 4 is a link member 17. Operating rods 18, 19, are pivotally secured to either end of link 17 by means of pins as shown in FIGURES 1–4. The opposite ends of operating rods 18 and 19 are provided with oblong holes or slots 20 in which there is disposed the hinge bolt or pin 21. Each operating rod 18, 19, includes a cam 22 for suitable engagement with a respective notch 23 of the cylinder 12 as shown in FIGURE 3.

Figure 4:
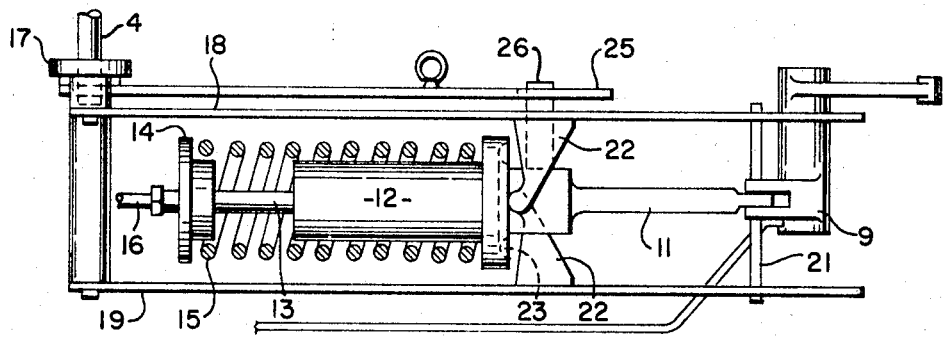
FIGURE 4 is an overhead elevational view, partly in section, of the hydrostatic vehicle drive control linkage of FIGURE 2.

In order to operatively provide engagement of a respective notch 23 and a cam 22 there is provided a selector fork 25 engaging a pin 26. Fork 25 may be raised and lowered by a direction reversing lever 24 to be operated by the vehicle driver. Direction reversing lever 24 is suitably connected to fork 25 by means of the mechanical linkage as shown in FIGURES 1 and 4.

The operation of the hydrostatic vehicle drive control of this invention will now be described.

The vehicle operator first selects the direction of motion of the vehicle by actuating the direction reversing lever 24 in a forward or reverse direction. Movement of lever 24 will cause plunger 11 to be either raised or lowered depending on the desired direction of movement of the vehicle. In FIGURE 3, plunger 11 is shown in a raised position with notches 23 of cylinder 12 engaging cam 22 of operating rod 18. Alternately, to reverse direction, the plunger 11 could be lowered such that notch 23 engages cam 22 of operating rod 19. With a notch 23 engaging a respective cam 22, the vehicle operator now depresses the driving pedal 8 thereby accelerating the internal combustion engine 1 and, at the same time, drawing the respective operating rod 18 or 19 to the right as shown in FIGURE 3. A rightward movement of operating rod 18 of FIGURE 3 is accomplished, for instance, by a clockwise rotation of link 9 causing a rightward movement of plunger 11. It should be pointed out that plunger 11 has an end extension portion pivotally secured to pin 21 as shown in FIGURE 4. A rightward movement of plunger 11 of FIGURE 3 produces a similar movement of cylinder 12 as cylinder 12 is carried by plunger 11. A notch 23 of cylinder 12 thus engages a cam 22 of the operating rod 18 to produce a rightward movement of operating rod 18 as shown in FIGURE 3. Thus, the link or lever 17 is rotated in a clockwise direction to produce clockwise rotation in the adjusting shaft 4. Clockwise rotation of adjusting shaft 4 produces rotation of the tiltable plate of the hydraulic motor 5 by means of the schematically indicated connection 4a of FIGURE 1. The variable displacement hydraulic pump 3 is thus brought from a neutral or no pumping condition into a condition approaching maximum displacement.

At this point, the variable displacement hydraulic pump 3 will deliver fluid to the hydraulic motor 5 according to the degree of tilt of the tiltable plate as set by the adjusting shaft 4. As soon as the pressure in the hydraulic system has reached a predetermined value, depending on the tension of the spring 15, the cylinder 12 of FIGURE 3 will be moved to the left of plunger 11 (communication between the interior of said cylinder and the output of said pump having been established by means of line 16, passageway 13 and orifice 13a) against the action of the compression spring 15. Increased pressure in the hydraulic system results when, for instance, the vehicle begins ascending a hill. As cylinder 12 of FIGURE 3 moves to the left the bias on cam 22 of operating rod 18 is thereby relieved and operating rod 18 thus tends to move to the left so as to move lever 17 toward a vertical position to decrease the displacement of pump 3. Thus when high pressures are encountered in the hydraulic system the displacement volume of the pump 3 is reduced as the linkage controlling the tiltable plate of the variable displacement hydraulic pump tends to return toward the neutral position.

This will all be accomplished despite the fact that the treadle 8 remains in a particular position to which it has been moved by the operator of the truck.

The hydrostatic vehicle drive control of this invention will readily be seen to be of a simple but yet reliable design. A direct linkage is provided between the driving pedal and the internal combustion engine. A direct linkage is also provided between the driving pedal and the tiltable plate of the variable displacement hydraulic pump whereby movement of the driving pedal to increase the speed of the internal combustion engine also increases the pumping volume of the pump. The hydraulic device 11, 12, forming a part of the control means operatively associated with the driving pedal and the variable displacement pump acts to decrease the pumping volume of the pump when the load increases the fluid pressure in the hydraulic lines 6.

What is claimed is:

1. In an engine powered hydrostatic vehicle drive having a variable displacement hydraulic pump and a hydraulic motor, a treadle for controlling the speed of the engine, control linkage operatively associated with the treadle and the pump whereby movement of the treadle to increase the speed of the engine increases the displacement of the pump, a hydraulic device mounted on a movable part of said control linkage so as to move with said part, and a fluid connection means between said pump and said hydraulic device whereby the fluid pressure generated by said pump acts on said hydraulic device to move said control linkage to decrease the displacement of said pump independently of treadle control of said engine.

2. The invention of claim 1 in which said hydraulic device includes a cylinder and a piston disposed within said cylinder, first abutment means at one end of said piston, an extension at the opposite end of said piston including second abutment means, and spring means between said first and second abutments to bias said cylinder against said first abutment means.

3. The invention of claim 2 in which said fluid connection means communicates pump fluid pressure to said cylinder and piston whereby increasing pressure will move said cylinder against the bias of said spring means to thereby decrease the displacement of said pump.

4. The invention of claim 3 in which said fluid connection means is further defined by a passageway in said extension and a tube connection between said pump and said extension.

5. In an engine powered hydrostatic vehicle drive having a variable displacement hydraulic pump and a fixed displacement hydraulic motor, control means to vary pump displacement as a function of the driving pedal adjustment and the load of the drive such that the pump displacement is automatically decreased when the load increases and vice versa, said control means comprising;
   a pair of operating rods capable of being optionally engaged by means of a driving dog controlled by a direction reversing lever,
   first linkage means connecting one end of each operating rod to the variable displacement hydraulic pump,
   second linkage means connecting said driving dog to the driving pedal whereby movement of the pedal to increase the speed of the engine increases the displacement of the pump,
   hydraulic means connected to the pressure circuit of the hydrostatic drive and operatively associated with said driving dog whereby the respective operating rod engaged by said driving dog is returned toward neutral position in the event of increasing load to thus decrease the displacement of said pump.

6. The invention of claim 5 in which said first linkage means is further defined by a link fixed to an adjusting shaft operably connected to said pump and pivotal about the axis of said adjusting shaft, and one end of each operating rod is pivotally connected to a respective end of said link.

7. The invention of claim 5 in which said second linkage means is further defined by a link operably connected to said driving pedal so as to be rotated by said driving pedal and said driving dog is pivotally connected to said link.

8. The invention of claim 7 in which the other end of each operating rod is pivotally and slidably connected to said link.

9. The invention of claim 5 in which said hydraulic means is further defined by a cylinder and a piston disposed within said cylinder, means providing communication between the pressure circuit of the hydrostatic drive and the interior of said cylinder, linkage means connecting said cylinder to the reversing lever, abutment means on the exterior surface of said cylinder to optionally engage a respective operating rod, said piston having an end pivotally linked to the driving pedal whereby the length of the driving dog defined by the cylinder and piston may be increased with increased pressure in the pressure circuit of the hydrostatic drive to thereby return a respective operating rod toward neutral position.

10. The invention of claim 9 in which said piston includes a first and second abutment shoulder and said cylinder is biased against one of said shoulders by a compression spring disposed between said first and second abutment shoulder.

11. The invention of claim 9 in which said communication means is further defined by a conduit leading from the pressure circuit to the interior of said cylinder.

References Cited

UNITED STATES PATENTS

| 2,497,489 | 2/1950 | Coursen et al. | 92—117 XR |
| 3,003,309 | 10/1961 | Bowers et al. | 60—19 |
| 3,167,907 | 2/1965 | Kempson | 60—19 |
| 3,250,340 | 5/1966 | Roberson | 180—66 XR |

FOREIGN PATENTS

| 670,086 | 4/1952 | Great Britain. |

BENJAMIN HERSH, *Primary Examiner.*

MILTON L. SMITH, *Assistant Examiner.*

U.S. Cl. X.R.

60—19